P. J. MURCKO.
REVERSIBLE PROPELLER.
APPLICATION FILED AUG. 14, 1916.
1,241,651.
Patented Oct. 2, 1917.
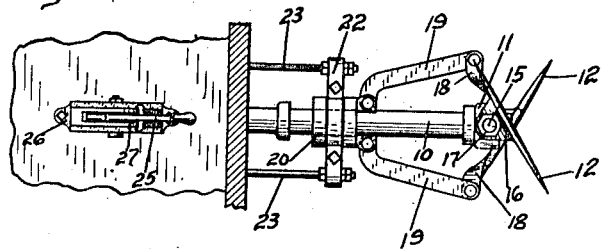
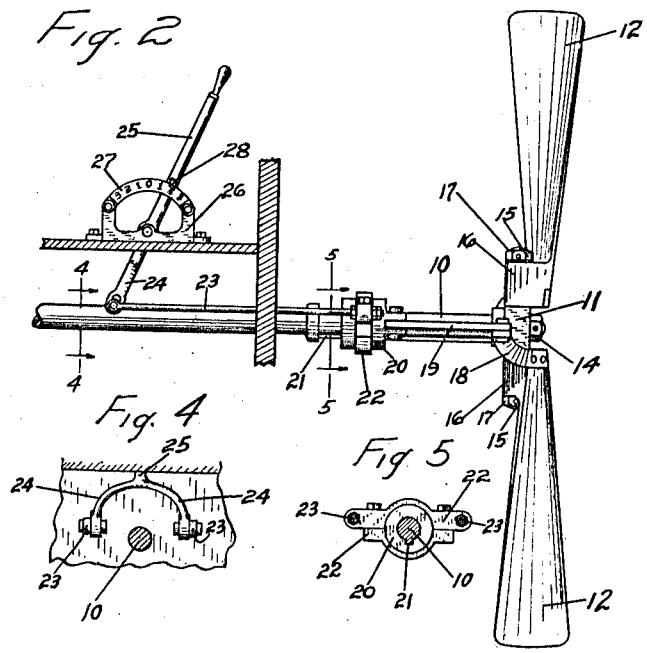
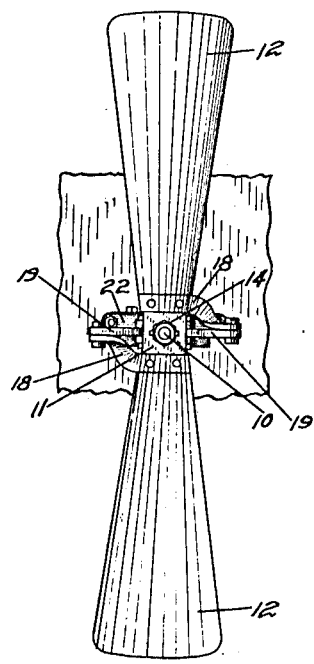
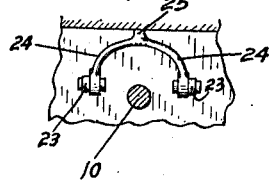
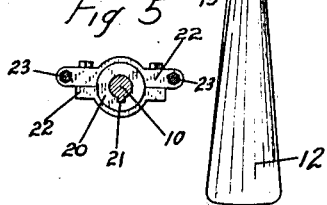
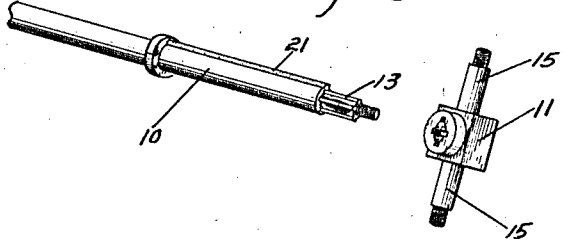
INVENTOR
Paul J. Murcko
BY
A. M. Wooster
ATTORNEY

UNITED STATES PATENT OFFICE.

PAUL J. MURCKO, OF BRIDGEPORT, CONNECTICUT.

REVERSIBLE PROPELLER.

1,241,651.	Specification of Letters Patent.	Patented Oct. 2, 1917.

Application filed August 14, 1916. Serial No. 114,715.

*To all whom it may concern:*

Be it known that I, PAUL J. MURCKO, a subject of the Emperor of Austria-Hungary, residing at Bridgeport, county of Fairfield, State of Connecticut, have invented an Improvement in Reversible Propellers, of which the following is a specification.

This invention relates to propellers for use either upon aeroplanes or motor boats and has for its object to provide a structure with which, by a simple movement on the part of the operator, the blades may be placed in the neutral position, or reversed, or adjusted to produce any required variation in speed, either forward or reverse.

With this end in view, I have devised the novel structure which I will now describe, referring to the accompanying drawing forming a part of this specification and using reference characters to indicate the several parts.

Figure 1 is a plan view of my novel propeller;

Fig. 2 a side elevation corresponding therewith;

Fig. 3 an end elevation as seen from the right in Figs. 1 and 2;

Fig. 4 a section on the line 4—4 in Fig. 2, looking in the direction of the arrows;

Fig. 5 a section on the line 5—5 in Fig. 2, looking in the direction of the arrows, and Fig. 6 is a perspective view showing the shaft and the propeller head disassembled.

10 denotes the shaft, 11 the propeller head, and 12 the blades. The head is rigidly secured to the shaft in any suitable manner, as by means of a splined connection 13 and a nut 14 engaging a reduced end of the shaft and locked against removal. The head is provided with studs 15 in alinement and the blades are provided with hubs 16 mounted to oscillate on the studs and shown as retained in place thereon by nuts 17 locked against removal. The studs are of course made slightly longer than the height of the hubs so as to permit free oscillation of the hubs carrying the blades. Each hub is provided with an arm 18 which extends outward therefrom and is pivoted to one of a pair of links, indicated by 19, the other ends of which are pivoted to a collar 20 which is adapted to slide longitudinally on the shaft. The sliding collar has an internal groove which receives a rib 21 on the shaft to lock the collar against rotation independently of the shaft, leaving it free to slide thereon. 22 denotes a yoke engaging a groove in the collar which rotates freely in the yoke. The collar is moved longitudinally on the shaft to cause the links to oscillate the blades axially in any suitable manner, as by means of rods 23 connected to the ends of the yoke respectively and to the branches 24 of a controlling lever 25 shown as fulcrumed on a bracket 26 provided with a quadrant 27 which indicates, in connection with a pointer 28 on the lever, the position of the blades.

The operation will be obvious from the drawing. The operator is enabled to place the blades in a neutral position or in position to produce any desired speed forward or reverse, within the compass of the blades, by manipulation of the controlling lever. When used upon motor boats, this invention enables the operator to change speed ahead or to reverse and change the reverse speed without changing the operation of the engine and without the use of reverse and change-speed gearing, which may be dispensed with. In aeroplanes, the invention is of great value as it does away with the necessity for holding the machine after the aviator has turned the propeller and until he can take his seat. With the present invention, the aviator can turn the propeller with the blades in the neutral position and then take his seat without the necessity for anyone holding the machine and can start the machine forward slowly and with gradually increasing speed by simply swinging the controlling lever and placing the blades at the desired speed as indicated by the position of the pointer relatively to the quadrant. By manipulation of the controlling lever the aviator can reduce or increase speed or reverse and regulate the reverse speed, without interference with the engine,

Having thus described my invention, I claim:—

A propeller comprising a head having studs, blades widest at their outer ends and tapering inward, hubs offset laterally from the blades and pivoted on the studs, arms extending from the hubs, a collar rotating with the head, links pivoted to the arms and to the collar, and means for reciprocating the collar, whereby the blades may be adjusted or reversed.

In testimony whereof I affix my signature.

PAUL J. MURCKO.